3,293,290
PROCESS FOR THE PRODUCTION OF UNSATURATED ALDEHYDES AND ACIDS
Duane L. Flint, Fullerton, and William D. Schaeffer, Pomona, Calif., assignors to Union Oil Company of California, Los Angeles, Calif., a corporation of California
No Drawing. Filed Mar. 4, 1963, Ser. No. 262,339
11 Claims. (Cl. 260—533)

This invention relates to the catalytic oxidation of low boiling alkanes, alkenes and aldehydes to unsaturated and oxygenated compounds. More particularly, this invention relates to the oxidation of low boiling hydrocarbons to unsaturated acids and, in the preferred embodiment, relates to the oxidation of propane to acrylic acid.

The prior art has proposed various catalysts for the vapor phase oxidation of unsaturated aldehydes to unsaturated acids, for example, U.S. Patent 2,881,212 proposes the use of phosphomolybdic acid. The oxidation of olefins to unsaturated aldehydes with a bismuth phosphomolybdate is described in U.S. Patent 2,941,007 and iron bismuth phosphomolybdates are disclosed for the oxidation of propylene to acrylic acid in Belgium Patent 611,961.

The aforementioned oxidations prepare unsaturated aldehydes from olefins or unsaturated acids from olefins or their aldehydes. It has been recognized that the catalysts used in these oxidations have little or no activity for the oxidation of alkanes and, indeed, U.S. 2,941,007 prescribes the use of low boiling alkanes as inert diluents for the reactant gases. Thus, the preparation of unsaturated acids and/or unsaturated aldehydes has, heretofore, consumed relatively expensive olefin or unsaturated aldehyde feedstocks.

It is an object of this invention to provide a catalyst which has an activity for the oxidation of low boiling alkanes to unsaturated acids and/or aldehydes.

It is also an object of this invention to provide a catalyst which has a high selectivity for the oxidation of olefins and alkanes to unsaturated acids.

It is a further object of this invention to provide a method for the oxidation of alkanes to unsaturated acids, specifically for the oxidation of propane to acrylic acid.

Other and related objects will be apparent from the following description.

We have now found that high yields of unsaturated acids can be obtained by the vapor phase oxidation of olefins and/or alkanes with molybdenum containing catalysts in the presence of a bromine or iodine compound. The presence of bromine or iodine increases the yield of the desired acid and imparts an activity to the catalyst for oxidation of low boiling alkanes. The activity of our catalyst is unique to the combination of a bromine or iodine compound and the aforementioned molybdate catalysts; other halogens exhibiting little or no promotional effect and the bromine or iodine compound exhibiting little or no effect with similar tungstate or chromate catalysts. Bromine and its compounds are preferred because of greater activity. The tendency of iodine compounds to form elemental iodine and the difficulties experienced with iodine in the process also makes the use of iodine compounds less preferred.

Various hydrocarbons can be oxidized to unsaturated acids and/or aldehydes by our catalyst. Readily available and low cost $C_3$ to $C_8$ alkanes and cycloalkanes are the preferred raw materials including propane, butane, isobutane, pentane, isopentane, cyclopentane, hexane, cyclohexane, isohexane, cycloheptane, heptane, isoheptane, octane, isooctane, etc.

Our process can also be used for the oxidation of the more conventionally employed $C_3$ to $C_8$ olefins including propylene, butene-1, butene-2, isobutene, pentene, isopentene, cyclopentene, 2-methyl-butene-2, hexene, isohexene, heptene, isoheptene, octene, isooctene, etc.

A variety of unsaturated aldehydes can also be completely oxidized to the unsaturated acid by use of our catalyst. Included in a listing of such are acrolein, methacrolein, crotonaldehyde, $\gamma$-ethylacrolein, $\beta$-methyl crotonaldehyde, dimethyl crotonaldehyde, $\beta$-ethyl crotonaldehyde, 2-hexenal, $\gamma$-isobutylacrolein, $\gamma$-amylacrolein, etc.

Examples of acids which can be produced by our oxidation of their parent hydrocarbon or aldehyde are: acrylic, vinylacetic, crotonic, isocrotonic, tiglic, allylacetic, angelic, ethylcrotonic, methacrylic, isopropylacrylic acid, etc.

As previously mentioned, the preferred hydrocarbon is a low boiling alkane having between 3 and about 8 carbons and, of these, propane and isobutane are most preferred because of the established value of their products, acrylic and methacrylic acid. During the oxidation of the alkane, concurrent oxidation to the olefin and to the unsaturated aldehyde occurs and these incompletely converted products can be separated from the desired unsaturated acid product and recycled to the oxidation step for complete oxidation to the desired acid.

The catalyst for use in our process contains molybdenum and can comprise molybdic or phosphomolybdic acids alone or in combination with various metal oxides. Some of the various metals which can be used in the combination are ferric molybdate, bismuth molybdate, ferric phosphomolybdate, bismuth phosphomolybdate or mixtures of any two or more of the aforementioned. A highly active catalyst which shows an enhanced activity for alkane oxidation in the presence of bromine compounds comprises a mixture of ferric and bismuth phosphomolybdates.

The catalyst can be used in any suitable form, e.g., deposited on a solid inert support or on the wall of the reaction zone. Various solid supports can be used including—but not excluding—other stable and inert solids—metal oxides such as silica, aluminua, Alundum, aluminum silicates, titania, zirconia, silicon carbide, etc.

Any of the art recognized and established methods for distending a catalytic agent on an inert support can, of course, be used for preparing the supported catalyst used in our process. The preferred technique comprises impregnation of the support with aqueous solutions of the active catalyst components, draining and drying of the support and, finally, calcination at temperatures between about 300° and 700° C. When only a single catalytic component is used, e.g., molybdic or phosphomolybdic acid, a single impregnation step can be used. When other components are desired, e.g., ferric, bismuth, or combinations thereof, these components can be impregnated in separate steps or can be added to the molybdenum impregnating solution generally as a soluble molybdate or phosphomolybdate salt. The relative amounts of these salts, i.e., of ferric or bismuth molybdate or phosphomolybdate provides a facile control of the elemental ratio of iron, bismuth, phosphorus and molybdenum in the finished catalyst.

To obtain suitably high concentrations of the desired metal cations in the final catalyst it may be necessary to add to the molybdic or phosphomolybdic solution various other salts of these metals having an anion which will volatilize during drying or calcining. To illustrate, ferric or bismuth nitrate, chloride, sulfate, etc., can be added to increase the content of these metals in the catalyst. Often, the solubility of the particular molybdate or phosphomolybdate solution would be exceeded by the addition of such salts and, in those instances, multiple impregnation steps can be used to deposit the desired amount of each catalyst component.

Other methods for distending the catalytic components on the inert support can, of course, be used including coprecipitation of the catalyst and the support from a mixed solution or sol or mechanical mixing of the oxide gels or powders.

The distended or supported catalyst can be powdered into solid particles from a micron or less to about 100 microns in average diameter. These powders are quite useful for suspension contacting. Larger powders, of the size customarily used for fluidized bed operation, can be prepared which pass about a 35 mesh screen but are retained on a 400 mesh screen when it is desired to use the catalyst as a fluidized bed. When the catalyst is employed in a packed column, granules or extrudates from about $\frac{1}{16}$ to about $\frac{1}{4}$ inch average diameter are used.

The catalyst can also be coated onto the inside wall of the reactor which, preferably, is a tubular reactor surrounded by or immersed in a heat exchange fluid to maintain a close control over the reaction temperature. In this embodiment, any or all the aforedescribed solutions useful in impregnation can also be used to coat the inside wall of the reactor.

Elemental iodine, bromine or compounds containing bromine or iodine in covalent or ionic bonding can be used as a suitable source of this promoting agent. In general, any bromine or iodine containing compound which vaporizes at temperatures of about 300° C. or lower can be used and bromine or its compounds are preferred. Examples of suitable promoters are: elemental bromine or iodine, nascent bromine or iodine, hydrogen bromide or iodide, ammonium bromide or iodide, ammonium bromate or iodate, alkyl or aryl bromides or iodides such as methyl bromide or iodide, ethyl bromide or iodide, propyl bromide or iodide, butyl bromide or iodide, amyl bromide or iodide, etc.

Generally, sufficient of a bromine or iodine substance is added to provide a concentration from several parts per million to about 1.0 volume percent (calculated as iodine or bromine); preferably from 0.05 to about 0.20 volume percent iodine or bromine. The bromine or iodine substance in the desired amount is added either directly to the oxidation zone or, if desired, to the reactants upstream of their entrance into the reactor.

The reactant supplied to our oxidation comprises a vapor stream of any of the aforementioned alkanes, olefins or unsaturated aldehydes. As previously mentioned, an outstanding feature of our process is its high activity for the direct oxidation of alkanes to the desired unsaturated aldehyde or acid and, therefore, the preferred reactants are alkanes, most preferably propane and isobutane. The alkane vapor stream is admixed with recycled materials, chiefly the olefin and, when the unsaturated aldehyde is to be completely oxidized to the unsaturated acid, it too is recycled.

The reactant vapors can be passed to the oxidation zone undiluted; however, to permit close control over the space rate and degree of conversion, an inert diluent vapor can also be added such as nitrogen, carbon dioxide, water vapor, or mixtures thereof. In general, vapor mixtures of the organic reactants containing from 0 to about 90 volume percent; preferably from 5 to about 50 volume percent; of an inert gas are used. The organic reactants, when applied to the oxidation of an alkane, comprise the recycled olefin and unsaturated aldehyde with sufficient alkane introduced for the net conversion.

Water vapor is the preferred diluent and can be used in amounts from about 25 to about 95 volume percent of the total vapor and gas rate to the reaction zone; preferably amounts between about 50 and 75 volume percent are used. When the aforementioned diluents, nitrogen or carbon oxides are used it is preferred to use them in admixture with water vapor as the latter appears to moderate the oxidation by avoiding excessive combustion.

Oxygen, air or mixtures thereof comprise the source of oxygen for the oxidation. In general, the oxygen is supplied to the reaction zone in amounts between about 1 and 20 volume percent of the organic reactants; preferably to avoid explosive mixtures in amounts between about 1 and 10 volume percent. The oxygen can be separately introduced into the reaction zone or can be admixed with the reactant vapors.

In the reaction zone, any suitable contacting between the vapor reactants and the catalyst can be employed. In the aforedescribed reactor with walls coated by the catalyst, the contacting is between the vapors and the reactor walls. The vapors can also be passed through a column of granules of the supported catalyst or the catalyst can be powdered and the powders suspended in the vapor stream. The suspended system can be either a fluidized bed with a solid-vapor interface or a suspension system having concurrent reactant and catalyst flow.

The reaction can be conducted at temperatures between about 300° and about 600° C.; preferably between about 450° and about 550° C. Pressures near atmospheric, e.g., 10 to 50 p.s.i.a. are preferred, however, greater pressures can also be used, if desired, from about 50 to about 5000 p.s.i.a.

The contact time is preferably short to minimize oxidation of the desired acid product. Generally contact times from about 0.1 to 25 seconds can be used; however, contact times from about 1 to about 10 seconds are preferred. The contact time in the coated reactor is, of course, readily determinable from the volume rate of reactants and vapor space of the reactor. With a supported catalyst; either fixed or fluidized; the apparent contact time is determinable from the apparent volume of the catalyst and the volume rate of the reactant vapors.

The temperature is maintained in the reaction zone by preheating the vapor stream to a suitable inlet temperature which will initiate the oxidation. The exothermic heat of oxidation can be removed by cooling of the reactor, particularly the coated wall reactor. Temperature control of the reactor can also be achieved in the suspension system by positioning cooling coils in the suspended catalyst. In the compact bed, the temperature can be controlled, generally, by proper control of the space rate and inlet temperature of the reactants, however, if necessary, a cool inert gas can be injected at one or more levels in the column.

The crude oxidate is removed as a vapor stream from the reaction zone and cooled by suitable means, e.g., injection of a quenching liquid, e.g., water or a high boiling organic liquid. Preferably, however, indirect heat exchange is employed and the vapor stream is simply passed to a water cooled condenser. The resultant mixed vapor liquid is separated and all or a portion of the vapor is recycled to the oxidation zone since it contains unconverted alkane and olefin, if any. The condensate temperature from the condenser can readily be controlled so that any low boiling by-products, e.g., formaldehyde, acetaldehyde, etc., will not condense but will be recycled with the vapor stream. Separation of these materials as well as the incompletely converted unsaturated aldehyde, e.g., acrolein, crotonaldehyde, etc., from the condensate can be improved by steam stripping the condensate and the resultant vapor recycled to the reactor.

The condensate can thereafter be worked up to isolate the desired unsaturated acid product, acrylic acid, methacrylic acid, crotonic acid, maleic anhydride, etc. by any conventional method. In general, this condensate comprises water, acetic acid and the unsaturated acid. If desired, the condensate can be esterified by the addition of a suitable catalyst, e.g., sulfuric acid, and a low boiling alcohol such as methanol, ethanol, isopropanol, etc. and the resulting esters separated by distillation. Generally, however, the condensate can simply be distilled to separate the desired product, an azeotroping agent being added when necessary to free the final product of water or acetic acid contamination.

The following examples will serve to illustrate our invention and present typical results obtainable therefrom:

EXAMPLE 1

In this and succeeding examples, a titanium tube, ½ inch in diameter and 20 feet in length was coiled and packed with a powder of the catalyst on an inert silica support. The catalyst was prepared by depositing between 100 and about 130 grams of total oxides on 400 milliliters of packed silica gel having a bulk density of 1.20 grams per cubic centimeter. The phosphomolybdate containing catalysts were prepared by impregnating the silica gel with phosphomolybdic acid to which was added the necessary quantities of ferric nitrate and/or bismuth nitrate to achieve the desired catalytic composition. To the resultant solutions was also added a slight amount of nitric acid to effect solubility. The impregnated catalyst was dried and calcined at 500° C. for 16 hours.

The catalyst was packed into the coiled tube and the coil immersed in a lead alloy bath having a melting point of 260° C. which served as a heat sink to maintain the desired reaction temperature.

The reactant stream to the reactor comprised a mixture of 26 volume percent of propylene, 6 volume percent oxygen, 21 volume percent nitrogen, 46 volume percent steam and 0.2 volume percent hydrogen bromide. The reactor outlet pressure was atmospheric, the inlet pressure was 20–30 p.s.i.g. and the apparent contact time, i.e., volume of catalyst divided by the gas volume flow rate, was from 3 to 4 seconds. The following results were obtained:

*Table 1*

| Test | 1 | 2 | 3 | 4 | 5 |
|---|---|---|---|---|---|
| Catalyst Components (Mol Ratios): | | | | | |
| Molybdenum | 100 | 100 | 100 | 100 | 100 |
| Phosphorus | 10 | 10 | 10 | 10 | 10 |
| Bismuth | 6 | 6 | 6 | 17 | 17 |
| Iron | 7 | 7 | 7 | 58 | 58 |
| Oxidized Product Yields: | | | | | |
| Carbon dioxide | 16 | 18 | 11 | 11 | 23 |
| Carbon monoxide | 13 | 19 | 11 | 15 | 14 |
| Acetaldehyde | 2 | 3 | 1 | 3 | 3 |
| Acetone | 1 | 1 | 1 | 1 | 1 |
| Acrolein | 50 | 40 | 38 | 53 | 31 |
| Acetic acid | 7 | 8 | 9 | 7 | 10 |
| Acrylic acid | 11 | 11 | 29 | 9 | 17 |
| Conversion (Percent) | 9.7 | 7.6 | 10.0 | 7.2 | 9.3 |
| Hydrogen bromide (Volume Percent) | 0.0 | [1] 0.2 | 0.2 | 0.0 | 0.2 |

[1] HCl.

The preceding data demonstrate that the addition of a bromine substance, hydrogen bromide, to the oxidation of propylene over a ferric bismuth phosphomolybdate catalyst increases the yield of acrylic acid and decreases the yield of acrolein. The addition of a comparable amount of hydrogen chloride failed to provide a similar selectivity to the catalyst.

EXAMPLE 2

The experiments were repeated with propane as the feedstock and the following results were obtained:

*Table 2*

| Test | 6 | 7 | 8 | 9 | 10 | 11 | 12 | 13 | 14 |
|---|---|---|---|---|---|---|---|---|---|
| Catalyst Components (Mol Ratios): | | | | | | | | | |
| Molybdenum | 100 | 100 | 100 | 100 | 100 | 100 | 100 | 100 | 100 |
| Phosphorus | 10 | 10 | 10 | 10 | 10 | 10 | 10 | 10 | 0 |
| Bismuth | 6 | 17 | 17 | 0 | 0 | 0 | 0 | 6 | 6 |
| Iron | 7 | 58 | 58 | 0 | 0 | 7 | 7 | 0 | 7 |
| Oxidized Product Yields (Percent): | | | | | | | | | |
| Carbon monoxide | 30 | | 44 | 10 | 35 | | 34 | 37 | 39 |
| Carbon dioxide | 14 | 65 | 23 | 22 | 12 | 18 | 8 | 7 | 12 |
| Formaldehyde | | | | 1 | 1 | 1 | 1 | 2 | 1 |
| Acetaldehyde | 1 | | 2 | | | | | 3 | |
| Acetone | | | | 1 | 1 | 1 | 2 | 1 | |
| Acrolein | 20 | 28 | 13 | 25 | 11 | 40 | 14 | 15 | 18 |
| Acetic acid | 4 | 3 | 5 | 27 | 23 | 29 | 13 | 17 | 5 |
| Acrylic acid | 31 | 5 | 12 | 13 | 16 | 11 | 28 | 18 | 24 |
| Conversion (Percent) | 11.1 | 1.3 | 8.0 | 1.8 | 7.3 | 1.1 | 13.5 | 8.7 | 11.9 |
| Hydrogen bromide (Volume Percent) | 0.2 | 0.0 | 0.2 | 0.0 | 0.2 | 0.0 | 0.2 | 0.2 | 0.2 |

A slight conversion to propylene was detected during the aforedescribed experiments and this by-product can readily be recycled for complete oxidation to the desired product. The amount of olefin production can be decreased and substantially precluded by increasing the oxygen rate to the reactor to about the stoichiometric amount, or greater, for oxidation of the hydrocarbon to the unsaturated acid.

The preceding demonstrate that the presence of a bromine compound, hydrogen bromide, greatly increased the activity of ferric bismuth phosphomolybdate, ferric phosphomolybdate, bismuth phosphomolybdate, phosphomolybdic acid and ferric and bismuth molybdates for the oxidation of a saturated alkane, propane. The high degree of selectivity for acrylic acid synthesis, observed in oxidation of propylene, was also present in the oxidation of propane.

Substantially the same enhancement of the catalyst activity can also be observed for production of methacrylic acid by substituting isobutylene or isobutane for the propylene and propane of Examples 1 and 2.

The preceding examples are intended solely to illustrate our invention and are not to be construed as unduly limiting thereof. Our invention is intended to be defined by the following claimed method steps or their equivalents.

We claim:

1. A process for the manufacture of unsaturated aldehydes and acids from a hydrocarbon having from 3 to about 8 carbon atoms and selected from the class consisting of monoolefins and paraffins that comprises contacting a gaseous mixture of said hydrocarbon and oxygen with a catalyst comprising an active component selected from the class consisting of phosphomolybdic acid, the iron and bismuth salts of said acid and mixtures thereof in the presence of from several parts per million to about 1.0 volume percent of said gaseous mixture of a promoter selected from the class consisting of hydrogen bromide and hydrogen iodide at a temperature from about 300° to about 600° centigrade.

2. A process for the manufacture of unsaturated aldehydes and acids from a saturated hydrocarbon having from 3 to about 8 carbon atoms which comprise contacting a gaseous mixture of said hydrocarbon and oxygen with a catalyst comprising an active component selected from the class consisting of phosphomolybdic acid, the iron and bismuth salts of said acid and mixtures thereof and in the presence of a promoter selected from the class consisting of hydrogen bromide and hydrogen iodide at a temperature from about 300° to about 600° centigrade.

3. The process of claim 2 for the manufacture of acrylic acid wherein propane is used as said hydrocarbon.

4. The oxidation of claim 3 wherein said catalyst comprises iron and bismuth phosphomolybdates on an inert support and wherein propylene is separated from the oxidized crude product and is recycled to said contacting.

5. The process of claim 2 for the manufacture of methacrylic acid wherein isobutene is used as said hydrocarbon.

6. The process of claim 2 wherein said promoter is hydrogen bromide.

7. The process of claim 2 wherein said gaseous mixture contains from 5 to 90 volume percent of an inert gas.

8. The oxidation of propane to acrylic acid which comprises contacting a gaseous mixture of propane, oxygen, water vapor and hydrogen bromide with a catalyst selected from the class consisting of, phosphomolybdic acid, the iron and bismuth salts of said acid and mixtures thereof at a temperature from about 300° to about 600° centigrade.

9. The oxidation of claim 8 wherein said catalyst comprises iron and bismuth phosphomolybdates on an inert support.

10. The process of claim 1 wherein said gaseous mixture contains from 50 to 75 volume percent water vapor.

11. The process of claim 1 wherein said promoter is hydrogen bromide and said hydrocarbon is propylene.

References Cited by the Examiner

UNITED STATES PATENTS

| 1,767,291 | 6/1930 | Kiss _____ | 260—604 |
| 2,369,182 | 2/1945 | Rust et al. _____ | 260—533 |
| 2,397,638 | 4/1946 | Bell et al. _____ | 260—683 X |
| 2,649,477 | 8/1953 | Jacobs et al. _____ | 260—533 |
| 2,807,647 | 9/1957 | Cheney et al. _____ | 260—604 |

FOREIGN PATENTS 605,502   10/1961   Belgium.

LORRAINE A. WEINBERGER, *Primary Examiner.*

DANIEL D. HORWITZ, *Examiner.*

I. R. PELLMAN, S. B. WILLIAMS,
　　　　　　　　　　　　　　　　*Assistant Examiners.*